Patented July 2, 1946

2,403,068

UNITED STATES PATENT OFFICE 2,403,068

MANUFACTURE OF CHEMICAL COMPOUNDS

Arvel O. Franz, Alton, Ill., and Leslie H. Juel, St. Louis, Mo., assignors to Olin Industries, Inc., a corporation of Delaware No Drawing. Application June 25, 1941, Serial No. 399,738

9 Claims. (Cl. 260—553)

This invention pertains to the manufacture of dialkyldiarylureas, and more particularly to an improved method for preparing compounds of this class involving the interaction of dialkylarylamines and carbonyl chloride at considerably elevated temperatures.

Methods which have heretofore been described for the manufacture of dialkyldiarylureas have generally involved one or more principal disadvantages, such as an unduly long time required for the reaction, the use of solvents or diluents in the reaction mixture making it necessary to employ reaction vessels of large capacity, the accumulation of by-products difficult to dispose of profitably, and the formation of products containing impurities the removal of which is extremely difficult by the usual procedures.

An object of this invention is the provision of an improved process for the preparation of dialkyldiarylureas, whereby the disadvantages of prior procedures are overcome.

Another object of this invention is the provision of a process for the manufacture of dialkyldiarylureas characterized by increased simplicity and economy of operation and by the obtainment of a more desirable product as compared with prior methods.

A further object of this invention is to provide conditions for the interaction of a dialkylarylamine and carbonyl chloride whereby the rate of reaction to form a dialkyldiarylurea is substantially increased and the formation of undesirable side products is avoided.

Other objects will appear from the following detail description.

The foregoing objects are advantageously accomplished in accordance with this invention by reacting a dialkylarylamine with substantially less than the theoretical amount of carbonyl chloride in the presence of a substance accelerating the production of the desired product and at a temperature within a definite range, as hereinafter specified. The reaction accelerant consists of a monoalkylarylamine in a proportion such that it constitutes 5 to 40 mol percent of the mixture with the dialkylarylamine. The amount of phosgene added should be from 60% to about 90% of the amount theoretically required for reaction with the mixture, and is preferably about the amount which would theoretically be required for reacting with the quantity of dialkylarylamine present in the initial mixture.

The reaction is carried out within a temperature range, the upper limit of which is fixed as the boiling point of the amine mixture and the lower limit of which is the decomposition temperature of the hydrochloride of the dialkylarylamine. This decomposition temperature, that is the point at and above which the hydrochloride rapidly decomposes at atmospheric pressure to yield monoalkylarylamine and alkyl chloride, will generally be found to be about 15° to 35° C. below the boiling point of the dialkylarylamine, and is for example, at about 175° C. for dimethylaniline and about 185° C. for diethylaniline hydrochlorides.

The carbonyl chloride is desirably added sufficiently rapidly to avoid the formation of a highly-colored crude product, while avoiding excessive rates such as would result in the formation of phenyl isocyanate and diphenylurea or analagous impurities.

When the operation is carried out with the observance of the above-stated conditions, the amine is rapidly converted to the desired dialkyldiarylurea, an easily-purified product being obtainable in large amounts with the use of relatively small size equipment. The characteristic ease with which the product of the present process can readily be purified is due to the almost complete suppression of the many side reactions which have a possibility of occurring between the reagents which are used. For example, at a temperature of around 100° C., a dialkylaniline and carbonyl chloride react almost entirely to form compounds of the Michler's ketone type. Such ketones may react with dialkylaniline to form highly colored triphenylmethane dyes. Phenyl isocyanate and diphenylurea are other impurities which might be formed from these reagents. However, products obtained in accordance with the present invention are pure white and do not have the irritating peppery odor, which has been attributed to the presence of phenyl isocyanate, which is characteristic of dialkyldiarylureas produced by prior methods.

In the preparation of dimethyldiphenylurea from pure dimethylaniline and carbonyl chloride as described by Wahl, Bulletin Societe Chimique (5) 1, 244-6 (1934), in accordance with the following equation:

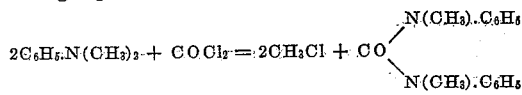

the avoidance of side reactions producing highly colored substances, phenylisocyanate, and other impurities, is extremely difficult. Although certain impurities may be avoided by the slow and careful addition of the carbonyl chloride (the rate of the reaction represented by the above equation is sufficiently low that unless precautions are taken to add the carbonyl chloride slowly, excessive amounts will be present in the reaction mixture and lead to the formation of undesirable compounds), any extended reaction period at the elevated temperature will result in the formation of highly colored substances.

In accordance with the present process, high rates of addition of the carbonyl chloride can be employed in view of the presence of the monoalkylarylamine, which reacts very rapidly with carbonyl chloride to yield dialkyldiarylurea. This change may be represented by the following equation:

$$2C_6H_5NHR + COCl_2 = CO(N.R.C_6H_5)_2 + 2HCl$$

R representing an alkyl group. The HCl which is liberated reacts with the dialkylarylamine to regenerate the monoalkyl derivative and evolve alkyl chloride, as follows:

$$C_6H_5NR_2 + HCl = C_6H_5NHR + RCl$$

Accordingly, some monoalkylarylamine is present in the mixture throughout the operation, tending to prevent the accumulation of a deleterious excess of carbonyl chloride.

At the conclusion of the operation, when 60% to 90% of the amount of carbonyl chloride theoretically required for reaction with all the amine present has been added, the unchanged amine is found to consist of a mixture of the mono- and dialkylarylamine. The unreacted amines can therefore be recovered from the reaction mixture and be added to fresh amine mixture for conversion by this process, which thus operates to result in a sole product, the desired dialkyldiarylurea.

In prior methods for the production of dialkyldiarylurea, wherein mixtures containing mono- and dialkylaniline were subjected to treatment with carbonyl chloride at temperatures below 100° C., the dialkylaniline component did not react with the carbonyl chloride but rather served the function of uniting with the HCl liberated by reaction of the monoalkylaniline, to result in the formation of dialkylaniline hydrochloride. Thus, the operation of the prior methods resulted in the accumulation of the tertiary amine or its hydrochloride, as a by-product, which could not be re-used in the process except by mixing with the difficultly obtainable and expensive monoalkylaniline.

In one example, constituting an illustrative embodiment of the process of this invention, 1475 parts by weight of a mixture of 65% di- and 35% monoethylaniline (percentages by weight) are heated in a suitable vessel to a temperature of 160° to 170° C., the supply of heat is stopped, and carbonyl chloride gas is added to the liquid at a rate of about 105 parts by weight per hour initially, and may subsequently be added more rapidly. The exothermic conversion of monoethylaniline to diethyldiphenylurea and the formation of diethylaniline hydrochloride set in immediately and causes a rise in temperature of the liquid to a temperature between 190° and 210°. The temperature is maintained within this range for the remainder of the reaction period, which may be readily, and preferably is, accomplished simply by controlling the flow of the carbonyl chloride gas; toward the end of the reaction period, some external heat may be supplied if necessary. If the temperature tends to decrease below 190° C., the gas flow is increased, while any tendency toward a temperature rise above 210° C. is obviated by decreasing the flow of gas. The flow of carbonyl chloride gas is stopped after about 300 parts by weight, (the amount equivalent to the diethylaniline content of the initial reaction mixture) have been added, which requires a total reaction time of about two and one-half to three and a half hours.

While various types of treating vessels may be adapted for carrying out the reaction, excellent results have been obtained with the use of a nickel reactor consisting of a vertical cylindrical tank provided with rounded ends. The tank may be provided with electrical heating coils or a heating jacket, is preferably externally insulated against excessive loss of heat, and is provided with a bottom outlet for discharging the reaction mixture and two openings at the top, one for the addition of the liquid amine mixture and the other leading to a reflux condenser. The latter preferably consists of an elongated condenser, which provides for the gradual air-cooling of the vapor evolved from the reaction mixture so that a vapor column is available in which gaseous amine can react with and remove any unreacted carbonyl chloride. Above this vapor reaction zone for scavenging any residual carbonyl chloride, a gradual cooling zone, which may be water-cooled, is provided in which amine vapor is condensed into large drops and returned to the reaction vessel, rapid condensation into fine drops or mist, and thereby mechanical loss of the amine, being prevented.

The carbonyl chloride may be introduced through a plurality of diffuser tubes, consisting for example, of hollow pipes provided with a large number of fine openings, which are inserted near the bottom of the reactor close to the base of the liquid column. The reactor is suitably of such dimensions as to provide a sufficiently high liquid column to absorb the carbonyl chloride gas substantially completely and at the same time so as to provide sufficiently extensive liquid surface that gas may be liberated without extensive foaming. A vessel having a cylindrical portion five feet high and three and a quarter feet in diameter, filled to not more than two-thirds of its capacity, has been found entirely satisfactory.

After the flow of carbonyl chloride gas has been stopped, the reaction mixture is discharged into an excess, for example, 7500 parts by weight, of water acidulated with hydrochloric or sulfuric acid, unchanged amine remaining in solution while the diethyldiphenylurea is precipitated. After filtration and washing, about 780 parts by weight of product are obtained, which in the dry state displays a melting point of about 69° to 70° C., melting to a clear liquid, and which is pale greenish-buff to pure white in color. After one crystallization from a suitable solvent such as ethyl or isopropyl alcohol, and drying, a pure white product having a setting point of 71.7° to 72.35° C., free from chlorides and other undesired impurities, is obtained.

The acidulated mother liquor separated from the first precipitate of diethydiphenylurea may be treated for recovery of unreacted mono- and diethylaniline by neutralizing the liquor with caustic soda solution, removing the amine layer which separates, and distilling the same.

Mixtures of dialkylarylamines with 5 to 40 mol percent of monoalkylarylamines may readily be converted to a dialkyldiarylurea product of high quality in accordance with the above-outlined procedure. In general, however, the initial temperature to which the mixture is heated before addition of carbonyl chloride gas is adjusted in accordance with the content of monoalkylarylamine, being increased as the content of the latter is decreased. For example, the initial temperature for a reaction mixture containing 9 mols of dialkylaniline per mol of monoalkylaniline is preferably adjusted at 175° to 185° C. prior to the addition of carbonyl chloride.

In cases where the starting material consists of the pure dialkylarylamine, for example diethylaniline, and the accelerant monalkylarylamine, for example monoethylaniline, is to be formed in the reaction mixture by addition of the required amount of anhydrous HCl and subsequent decomposition of the hydrochloride on heating, the mixture of the dialkyldiarylamine and its hydrochloride is heated to a temperature within the desired range for the reaction, for example 190° C. to 210° C., before any addition of carbonyl chloride is made.

Alkyl chloride of high purity may be recovered from the exit gases discharged from the reaction vessel, and may be utilized, if desired, for the conversion of aryl amine to the desired mixture of mono- and dialkylarylamine.

If an amount of carbonyl chloride in excess of 90% of the theoretical requirement is added or the reaction temperature is allowed to exceed the boiling point of the initial amine mixture, an undesirable product containing at least several percent of diphenylurea and phenyl isocyanate is obtained. On the other hand, if the temperature of the reaction liquid during the addition of the carbonyl chloride is permitted to fall below the decomposition temperature of the dialkylarylamine hydrochloride, a highly-colored crude product will result.

When dialkylaniline is treated under the above-described procedure with carbonyl chloride, but in the absence of monoalkylaniline, whether added as such or formed in the mixture by the initial addition of anhydrous HCl and the subsequent decomposition of the hydrochloride, a product is obtained which is highly colored and contaminated with at least several percent of phenyl isocyanate and diphenylurea. Such a product, even after a number of recrystallizations, retains sufficient impurity so that an abnormally low setting point is displayed, the color is buff to brown rather than the desired high white, and the material exhibits an irritating odor. If, on the other hand, in attempts to avoid the formation of such impurities, the carbonyl chloride is added at a much slower rate such that the entire reaction requires about 5 to 8 hours, a highly colored product is obtained due to the formation of compounds of the Michler's ketone type and of triphenylmethane dye materials, which may arise in part from decomposition of the dialkyldiarylurea itself. These colored impurities are extremely difficult to remove, and a pure white product is not obtained even after several recrystallizations.

The method in accordance with this invention may accordingly be utilized to advantage in the preparation of symmetrical tetra-substituted ureas containing two alkyl and two aryl radicals. Two of the radicals introduced may consist of methyl, ethyl, propyl, isopropyl, butyl, amyl, or other alkyl groups, while the two aromatic groups may consist of phenyl, naphthyl, xenyl, or other aryl groups. The method may likewise be utilized for the production of mixed dialkyldiarylureas, such as methylethyldiphenylurea by the use in the reaction mixture of different tertiary amines or of a tertiary and a secondary amine containing different alkyl groups.

The advantages of the present process are accordingly obtainable when carbonyl chloride is reacted with a mixture of dialkylarylamine with 5 to 40 mol percent of monoalkylarylamine, at a temperature which is between the decomposition point of the dialkylarylamine hydrochloride and the boiling point of the amine mixture. The decomposition point of the tertiary amine hydrochloride may be determined very readily by heating a small sample of the hydrochloride in a closed tube having a vapor outlet and noting the temperature at which a brisk evolution of gas (alkyl chloride) occurs. A reaction temperature within the range of about 190° to 210° C. has been found suitable for the preparation of dimethyldiphenylurea, diethyldiphenylurea, and methylethyldiphenylurea in accordance with the process of this invention, while a temperature within the range of 240° to 250° C. has been found satisfactory for the preparation of dibutyldiphenylurea.

It is to be understood that this invention is not limited to the details of procedure hereinbefore specifically described for the purpose of illustration but that variations and modifications may be made without departing from the spirit thereof, and that such variations and modifications are, although not specifically described herein, contemplated by and within the scope of the appended claims.

Having now described the invention, what is claimed as new and is desired to be secured by Letters Patent, is:

1. In the manufacture of dialkyldiarylureas, the process comprising interacting carbonyl chloride with a mixture, containing a dialkylarylamine and 5 to 40 mol percent of a monoalkylarylamine, at a temperature between the decomposition point of the hydrochloride of the said dialkylarylamine and the boiling point of the said mixture, the carbonyl chloride being added in an amount equal to about 60 to 90 percent of the total theoretically required by the said mixture.

2. In the manufacture of dialkyldiarylureas, the process comprising interacting carbonyl chloride with a mixture, containing a dialkylarylamine and 5 to 40 mol percent of a monoalkylarylamine, at a temperature between the decomposition point of the hydrochloride of the said dialkylarylamine and the boiling point of the said mixture, the carbonyl chloride being added in an amount equal to about the quantity required for reaction with the tertiary amine component of the said mixture.

3. In the manufacture of dialkyldiarylureas, the process comprising interacting carbonyl chloride with a mixture, containing a dialkylaniline and 5 to 40 mol percent of a monoalkylaniline, at a temperature between the decomposition point of the hydrochloride of the said dialkylaniline and the boiling point of the said mixture, and carbonyl chloride being added in an amount equal to about 60 to 90 percent of the total theoretically required by the said mixture.

4. In the manufacture of dialkyldiarylureas, the process comprising interacting carbonyl chloride with a mixture, containing a dialkylaniline and 5 to 40 mol percent of a monoalkylaniline, at a temperature between the decomposition point of the hydrochloride of the said dialkylaniline and the boiling point of the said mixture, the carbonyl chloride being added in an amount equal to about the quantity required for reaction with the dialkylaniline initially present in the said mixture.

5. In the manufacture of dialkyldiarylureas, the process comprising interacting carbonyl chloride with a mixture containing diethylaniline and 5 to 40 mol percent of monoethylaniline, at a temperature between about 190° C. and 210° C., the carbonyl chloride being added in an amount equal to 60 to 90 percent of the total theoretically required by the said mixture.

6. In the manufacture of dialkyldiarylureas, the process comprising interacting carbonyl chloride with a mixture containing diethylaniline and 5 to 40 mol percent of monoethylaniline, at a temperature between about 190° C. and 210° C., the carbonyl chloride being added in an amount equal to about the quantity required for reaction with the diethylaniline initially present in the said mixture.

7. In the manufacture of dialkyldiarylureas, the process comprising providing a mixture containing a dialkylarylamine and 5 to 40 mol percent of a monoalkylarylamine at a temperature between the decomposition point of the hydrochloride of the said dialkylarylamine and the boiling point of the said mixture, and interacting with said mixture an amount of carbonyl chloride equivalent to 60 to 90 percent of the total theoretically required by the said mixture, the rate of addition of the carbonyl chloride being controlled so as to maintain the said temperature.

8. In the manufacture of dialkyldiarylureas, the process comprising providing a mixture containing a dialkylaniline and 5 to 40 mol percent of a monoalkylaniline at a temperature between the decomposition point of the hydrochloride of the said dialkylaniline and the boiling point of the said mixture, and interacting with said mixture an amount of carbonyl chloride equivalent to 60 to 90 percent of the total theoretically required by the said mixture, the rate of addition of the carbonyl chloride being controlled so as to maintain the said temperature.

9. In the manufacture of dialkyldiarylureas, the process comprising providing a mixture containing diethylaniline and 5 to 40 mol percent of monoethylaniline at a temperature of 190° to 210° C., and interacting with said mixture an amount of carbonyl chloride equivalent to 60 to 90 percent of the total theoretically required by the said mixture, the rate of addition of the carbonyl chloride being controlled so as to maintain the said temperature.

ARVEL O. FRANZ.
LESLIE H. JUEL.